US000001260H

United States Statutory Invention Registration [19]

[11] Reg. Number: H1260

[43] Published: Dec. 7, 1993

Towe

[54] METHOD FOR FORMING A SOLID OXIDE FUEL CELL

[75] Inventor: Carey A. Towe, North August, S.C.

[73] Assignee: Caterpillar Inc., Peoria, Ill.

[21] Appl. No.: 956,218

[22] Filed: Oct. 5, 1992

[51] Int. Cl.[5] ..... C03B 29/00

[52] U.S. Cl. ..... 156/89; 264/25; 264/61

[58] Field of Search ..... 156/89; 264/25, 61, 264/121, 259, 265, 309

[56] References Cited

U.S. PATENT DOCUMENTS

| | | | |
|---|---|---|---|
| 3,460,991 | 8/1969 | White, Jr. | 136/86 |
| 4,614,628 | 9/1986 | Hsu et al. | 264/61 |
| 5,145,753 | 9/1992 | Irino et al. | 429/40 |

OTHER PUBLICATIONS

Patent Abstracts of Japan E-749, vol. 13, No. 176 Apr. 25, 1989.

*Primary Examiner*—Robert L. Stoll
*Assistant Examiner*—Joseph D. Anthony
*Attorney, Agent, or Firm*—Frank L. Hart

[57] ABSTRACT

A method for forming a solid oxide fuel cell of yttria stabilized zirconia on a substrate, separating the resultant electrolytic layer from the substrate, and thereafter plasma spraying ceramic powder materials and forming an anode and a cathode on the electrolytic layer.

1 Claim, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR FORMING A SOLID OXIDE FUEL CELL

TECHNICAL FIELD

This invention relates generally to a method or process for forming a solid oxide fuel cell (U.S. Classification 264/61; 264/80, 264/81).

BACKGROUND ART

Prior to the present invention, zirconia electrolyte, as disclosed in U.S. Pat. No. 3,460,991, which issued to Donald W. White, has been shaped in tubular configuration. It has proven to be mechanically delicate, prone to fracture under thermal cycling and has low volumetric power density. U.S. Pat. No. 4,614,628 which issued on Sep. 30, 1986 to Michael S. Hsu et al. shows a process similar to the instant invention but has steps of firing which are different than the instant invention wherein said firing takes place after all materials are deposited and does not include the densifying steps nor the plasma spraying steps of this invention. Therefore, the instant invention is an improvement over that disclosed in the Hsu patent and overcomes one or more of the problems associated with the prior art.

DISCLOSURE OF THE INVENTION

In one aspect of the present invention, a method is set forth for forming a solid oxide fuel cell. A substrate of corrugated configuration is prepared to have a first surface roughness in the range of about 30μ to about 70μ inches (0.00030–0.00070 inches). A first ceramic powder material of yttria stabilized zirconia (Y-$ZrO_2$) is then plasma sprayed on the first surface of the substrate. The first material is continued to be plasma sprayed to form an electrolytic layer of said first material having first and second surfaces, a thickness in the range of about 0.02 inches to about 0.05 inches which is densified with zirconia ($ZrO_2$) under vacuum. Thereafter, the electrolytic layer is separated from the substrate.

Further plasma spraying is then initiated on the separated electrolytic layer with no heating of the electrolytic layer after separation from the substrate and before laying down of further plasma layers. A second plasma powder material is plasma sprayed on the first surface of the electrolytic layer and a third ceramic powder material is plasma sprayed on the second surface of the electrolytic layer. The second material is one of an anode material and a cathode material and said third material is the other of said anode material and cathode material.

Plasma spraying of said anode material and said cathode material is continued to form an anode layer on said electrolytic layer and a cathode layer on an opposed side of said electrolytic layer. Each of the anode layer and the cathode layer have a thickness in the range of about 0.002 to about 0.01 inches. The anode material is a nickel zirconia composite (Ni/$ZrO_2$) and the cathode material is strontium doped lanthanum manganate (Sr-$LaMnO_3$). Thus, a 3-layer composite is formed.

A second 3-layer composite is formed. At least one of the 3-layer composites is then plasma sprayed with an interconnect material of magnesium doped chromate ($LaMgCrO_3$), densified with magnesia-chromic oxide (MgO-$Cr_2O_3$). The two 3-layer composites are thereafter brought together and bonded to form a unit. The density of the unit is then increased to a value greater than about 95% theoretical density by firing the unit to a temperature sufficient.

BEST MODE FOR CARRYING OUT THE INVENTION

In the method of this invention, a substrate is provided for forming the solid oxide fuel cell of the desired configuration. The substrate can be formed of copper, aluminum or graphite, for example, and can be of practically any configuration that is adapted to define fuel and air passageways. The preferred embodiment, which will have great strength for stacking of units is of a corrugated configuration defined by a corrugated copper substrate.

The substrate has a requisite degree of roughness which allows particles to adhere until a continuous coating of the desired thickness is obtained while permitting subsequent removal of the electrolyte plate by thermal or mechanical means which do not cause damage to the solid-oxide electrolyte plate. Suitable roughness or irregularities of the substrate surface can be achieved using blast of glass beads. Generally, the degree of roughness desired are irregularities between about 30μ inches to about 70μ inches (0.00030–0.00070 inches).

In one embodiment of the present invention, a substrate of corrugated configuration is prepared to have a first surface roughness in the range of about 30μ inches to about 70μ inches. A first ceramic powder material of yttria stabilized zirconia (Y-$ZrO_2$) is then plasma sprayed on the first surface of the substrate. the first material is continued to be plasma sprayed to form an electrolytic layer of said first material having first and second surfaces, a thickness in the range of about 0.02 inches to about 0.05 inches and which is densified with zirconia ($ZrO_2$) under vacuum. Thereafter, the electrolytic layer is separated from the substrate.

Further plasma spraying is then initiated on the separated electrolytic layer with no heating of the electrolytic layer after separation from the substrate and before laying down of further plasma layers. A second plasma powder material is plasma sprayed on the first surface of the electrolytic layer and a third ceramic powder material is plasma sprayed on the second surface of the electrolytic layer. The second material is one of an anode material and a cathode material and said third material is the other of said anode material and cathode material.

Plasma spraying of said anode material and said cathode material is continued to form an anode layer on said electrolytic layer and a cathode layer on an opposed side of said electrolytic layer. Each of the anode layer and the cathode layer have a thickness in the range of about 0.002 inches to about 0.01 inches. The anode material is nickel zirconia composite (Ni/$ZrO_2$) and the cathode material is strontium doped lanthanum manganate (Sr-$LaMnO_3$) Thus, a 3-layer composite is formed.

A second 3-layer composite is then formed. At least one of the 3-layer composites is then plasma sprayed with an interconnect material of magnesium doped chromate ($LaMgCrO_3$), densified with magnesiachromic oxide (MgO-$Cr_2O_3$). The two 3-layer composites are thereafter brought together and bonded to form a unit. The density of the unit is then increased to a value greater than 95% theoretical density by firing the unit to a temperature sufficient.

The firing temperature is generally in a range of about 1400° C. to about 1600° C., preferably about 1500° C. The substrate roughness is preferably about 0.00050μ inches. The electrolytic layer preferably has a thickness of about 0.03 inches and the other two layers each preferably have a thickness of about 0.006 inches.

It is, therefore, obvious that by plasma spraying all layers of the fuel cell unit, waste of time, labor and equipment is reduced.

In this invention, ceramic powders are processed by a sol-gel technique to produce fine particles of uniform size, shape, and high purity. The sol-gel technique is well known to one skilled in the art. These fine powders are most beneficial to net-shape ceramics into complex geometries with minimal distortion as is common in heretofore prior art forming methods.

It has been discovered that plasma spray parameters of power level and argon flow rate significantly lower porosity in the electrolytic layer when the power level is maintained at a light level and the argon flow rate is maintained at a low level. Spray distance from the plasma gun to the object being sprayed seemed to have little effect on porosity. It has also been discovered that the thermal expansion coefficient of $NiO\text{-}ZrO_2$ increases as the ratio of NiO to $ZrO_2$ is increased in the range from 22 to 37 weight percent NiO. At 22% NiO, the thermal expansion is 5% greater than $10Y\text{-}ZrO_2$ and 2% greater than $Sr\text{-}LaMnO_3$.

Other aspects, objects and advantages of this invention can be obtained from a study of the disclosure and the appended claims.

I claim:

1. A method for forming a solid oxide fuel cell, comprising:

step 1—preparing a substrate of corrugated configuration to have a surface roughness in the range of about 30 to about 70 $\mu$ inches (0.00030–0.00070 inches);

step 2—plasma spraying a first ceramic powder material comprising yttria stabilized zirconia ($Y\text{-}ZrO_2$) onto said substrate;

step 3—continuing to plasma spray said first material onto said substrate and forming an electrolytic layer of said first material having first and second surfaces and a thickness in the range of about 0.02 inches to about 0.05 inches;

step 4—separating the electrolytic layer from said substrate;

step 5—plasma spraying a second ceramic powder material on the first surface of the electrolytic layer and plasma spraying a third ceramic powder material on the second surface of the electrolytic layer prior to heating of the electrolytic layer after separation step #4, wherein said second material is an anode material or a cathode material and said third material being the other of said anode material and cathode material;

step 6—continuing to plasma spray said anode material and forming an anode layer on said electrolytic layer, said anode layer having a thickness in the range of about 0.002 to about 0.01 inches and continuing to spray said cathode material and forming a cathode layer on the electrolytic layer having a thickness in the range of about 0.002 to about 0.01 inches, said anode material being nickel zirconia composite ($Ni/ZrO_2$) and said cathode material being strontium doped lanthanum manganate ($Sr\text{-}LaMnO_3$) and thereby forming a 3-layer composite;

step 7—repeating steps 2–6 and forming a second 3-layer composite;

step 8—plasma spraying an interconnect material of magnesium doped chromate ($LaMgCrO_3$), densified with magnesia-chromic oxide ($Mgo\text{-}Cr_2O_3$), on at least one of the 3-layer composites;

step 9—assembling the 3-layer composites together; and step 10—bonding the assembled 3-layer composites together to form a unit and increasing and density of the unit to a value greater than 95% theoretical density by firing the unit to a temperature sufficient.

* * * * *